INVENTORS:
ROBERT H. NEUSEL
HOMER EUGENE HUNLEY
BY
*Elliott & Pastoriza*
ATTORNEYS United States Patent Office 3,566,304
Patented Feb. 23, 1971

3,566,304
GAS LASER PRESSURE CONTROL FOR MAINTAINING CONSTANT PRESSURE
Robert H. Neusel, Malibu, and Homer Eugene Hunley, Hawthorne, Calif., assignors to Union Carbide Corporation, a corporation of New York
Filed Mar. 20, 1968, Ser. No. 714,729
Int. Cl. H01j 17/22, 61/28; H01s 3/00
U.S. Cl. 331—94.5                                    5 Claims

ABSTRACT OF THE DISCLOSURE

A sensor circuit is provided for detecting a reduction in the gas pressure of an ion laser. The noise signal voltages in the plasma current of the gas laser increase rapidly with a reduction in pressure. The sensor takes advantage of this phenomenon by detecting the noise signal spectrum in the plasma current. A discriminating circuit passes only those noise signals in the noise spectrum exceeding a predetermined voltage value and provides a control signal whenever the gas pressure falls below a predetermined value resulting in the increased voltage noise signals. This control signal is utilized to operate a solenoid valve to automatically pass refill gas to the laser tube and thereby maintain the gas pressure in the tube within a predetermined pressure range.

---

Figure 1:
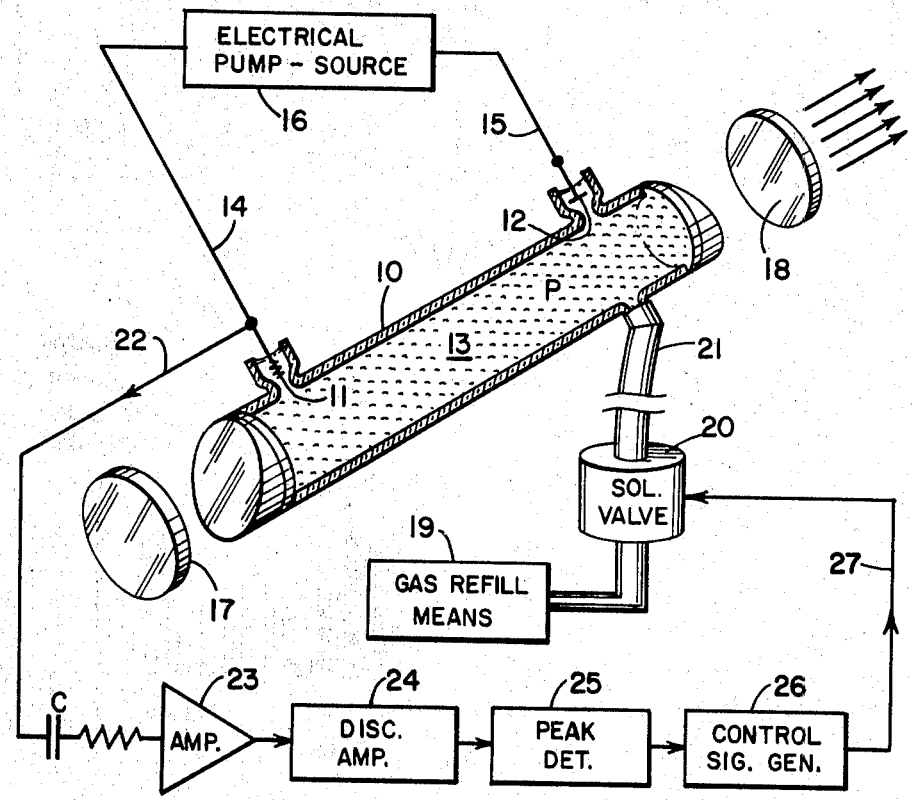

This invention relates generally to gas lasers and more particularly to a novel sensor and control for assuring that the gas pressure in the laser is maintained within a given pressure range for optimum operation.

Gas or ion lasers of the type under consideration include an elongated hermetically sealed tube filled with a suitable gas such as argon or krypton at a given low pressure. Anode and cathode electrodes are provided adjacent opposite ends of the tube for generating a plasma current to effect lasering action in the gas. Regenerative means in the form of end mirrors are usually disposed outside of the tube at opposite ends to define the optical cavity for the laser system. One of these mirrors is partially transparent to the stimulated radiation for coupling the laser light out of the system.

For optimum lasering action, it is found that the pressure of the gas within the tube should be maintained at a predetermined value or within a predetermined limited pressure range. After prolonged operation of the device, the gas pressure tends to decrease and it is therefore necessary to periodically refill the tube.

The pressure ranges of gas lasers are in the order of one to one hundred microns and to detect a change in such pressures, detectors such as thermo-couples or pirani gauges have been used. However, at these pressure ranges, such detectors are not very accurate nor do they provide consistent readings.

With the foregoing in mind, it is a primary object of the present invention to provide a novel gas laser pressure sensor or detector which will provide a more accurate indication of a reduction in gas pressure than has been possible heretofore.

More particularly, it is an object to provide a novel gas laser pressure sensor in combination with a gas refill source and control valve such that refill gas is automatically passed to the laser tube in response to a control signal generated whenever the pressure in the tube falls below a desired or given value.

Briefly, these and other objects and advantages of this invention are realized by detecting the plasma current noise voltage in the laser tube and utilizing this voltage or a portion thereof to indicate a change in the gas pressure. In this respect, we have correlated the noise voltage with the gas pressure and find that when the pressure is at an optimum value, noise voltage signals in the plasma current contain no spectral components of frequency higher than about one megacycle per second. As the pressure decreases, the noise voltage builds up in value and spectral components having frequencies higher than ten megacycles per second are present.

In accord with the invention, these higher voltage values are sensed by means of a high pass amplifier and discriminating means such that a control signal is generated only when the noise signal voltage exceeds a predetermined value. The presence of this control signal thus indicates a reduciton in the laser gas pressure below its optimum value. In accord with further features of this invention, this control signal is employed to operate a control valve to thereby automatically pass refill gas to the laser tube.

Figure 2:
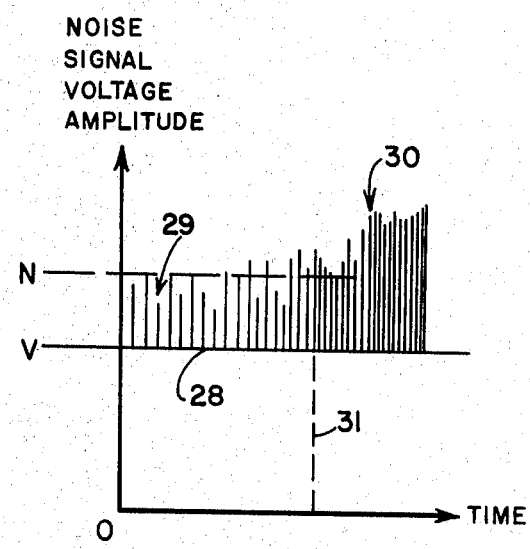

A better understanding of the invention will be had by now referring to the accompanying drawing, in which:

FIG. 1 is a highly schematic diagram of a gas laser incorporating the gas pressure sensor of this invention; and FIG. 2 is a plot of noise signal voltages over a period of time during which a reduction in the laser tube gas pressure occurs useful in explaining the operation of the system of FIG. 1.

Referring first to FIG. 1 there is shown a gas laser including an elongated hermetically sealed tube 10 provided with cathode and anode electrodes 11 and 12 adjacent opposite ends of the tube. The tube itself is filled with a gas 13 such as argon or krypton at a given, optimum pressure P. Plasma current passes between the electrodes when energized through leads 14 and 15 from a suitable electrical pump source 16. Regenerative end means are schematically illustrated in the form of end mirrors 17 and 18 disposed exterior of the tube 10 in proper alignment to define an optical cavity. The end mirror 17 may be 100% reflecting and the end mirror 18 only partially reflecting and partially transmitting to enable coupling out of the laser light from the cavity.

After prolonged operation of the gas laser, the pressure P within the tube tends to decrease with a result in loss of efficiency of the lasering action. This decreased pressure is overcome by passing further gas to the tube as from a gas refill source 19, valve 20 and suitable hose coupling 21.

Heretofore, and as already mentioned, pressure detectors such as thermo-couples or pirani gauges serve to indicate such reduction in pressure so that an operator upon observing this reduction would operate the valve 20 to pass refill gas to the tube.

In accord with one feature of the present invention, this reduction in pressure is sensed by an amplifier and discriminating circuit responsive to certain portions of the noise signal voltages inherent in the plasma current. As shown in FIG. 1 the circuit includes a lead 22 connected to the cathode 11 of the laser and coupled through a high pass condenser C and coupling resistance to a high pass amplifier 23. The output of the amplifier 23 in turn connects to a discriminating means including a discriminating amplifier 24, peak detector 25, and a control signal generator 26. The output from the generator 26 is passed by lead 27 to the solenoid valve 20 so that the valve will automatically open in response to the presence of such control signal.

FIG. 2 illustrates a noise signal spectrum useful in explaining the operation of the system of FIG. 1. In FIG. 2, there is shown a voltage level 28 including portions of noise signals 29. These signals include no components having frequencies higher than about one megacycle per second and their peak voltage values do not exceed a given voltage value N when the pressure P of the gas 13 in the laser tube 10 of FIG. 1 falls within a given pressure range at which optimum operation occurs. As the pressure of the gas in the laser tube decreases, it is found that the voltage of the noise signals present in the plasma current increases and that spectral components having frequencies of the order of ten megacycles and higher are generated. In FIG. 2, these latter signals are indicated at 30 it being assumed that the reduction took place after a time indicated by the dashed vertical line 31.

Referring again to FIG. 1, the high frequency spectral components of the noise signal voltage are passed through the high pass amplifier 23 to the discriminating amplifier 24. The high pass amplifier amplifies the noise voltage and the discriminator rejects noise spikes with a voltage below the given voltage value N described in FIG. 2. The peak detector 25 averages the noise spikes and the control signal generator 26 provides a sufficient control signal to operate the solenoid valve 20.

Opening of the valve 20 by the control signal on the lead 27 will permit gas to pass from the refill means 19 to the laser tube to thereby increase the pressure P. As this pressure increases, the noise voltage will drop to a level below the given voltage value N described in FIG. 2. As a result, there will be no output from the peak detector 25 and no control signal generated. In the absence of the control signal, the solenoid valve 20 will close. The solenoid valve will not again be reactivated until the pressure in the tube drops a sufficient value to result in the presence of noise voltage signals higher than the given value N.

From the foregoing, it will thus be evident that the present invention not only provides a unique means for indicating a reduction in pressure in a gas laser but in addition provides a means for automatically maintaining this pressure within a desired pressure range.

What is claimed is:

1. A sensor for detecting a change in the pressure of gas in a gas laser, comprising: electrical means coupled to said gas laser and responsive to noise voltages present in the plasma current of said gas laser, said electrical means including discriminating means for providing a signal only when said noise voltages exceed a predetermined value of voltage as a consequence of a reduction in said gas pressure below a given pressure.

2. A sensor according to claim 1, including gas refill means for said gas laser; and means connected to said electrical means and responsive to said signal to pass gas from said refill means to said laser whereby said gas pressure is automatically maintained substantially at said given value of pressure.

3. An ion laser including a hermetically sealed tube containing gas at a pressure falling within a predetermined range; anode and cathode electrodes connected to a source of electrical energy for generating plasma current to effect laser action in said gas; amplifier means electrically coupled to said ion laser to receive noise voltage signals present in said plasma current; and discriminating means connected to the output of said amplifier means for providing a control signal only when the voltage of said noise signals exceeds a predetermined value as a consequence of a reduction in gas pressure in said tube below a given pressure value within said range, whereby the presence of said control signal indicates that the gas pressure in said tube must be increased.

4. The subject matter of claim 3, including: a source of refill gas for said tube; an electrically operated control valve connected between said source and tube; and means connecting said discriminating means to said control valve, said control valve being responsive to the presence of said control signal to open and responsive to the absence of said control signal to close, whereby said gas pressure is automatically maintained within said predetermined range.

5. The subject matter of claim 4, in which said amplifier constitutes a high pass amplifier for noise signals having frequency components higher than one megacycle per second, said discriminating circuit including a peak voltage detector for passing only peak noise signals of voltage higher than said predetermined value, said control signal constituting a function of the average voltage value of said peak noise signals.

References Cited
UNITED STATES PATENTS

| | | | |
|---|---|---|---|
| 1,010,670 | 12/1911 | Moore | 315—110 |
| 2,962,593 | 11/1960 | Thomas | 313—175X |
| 2,964,665 | 12/1960 | Brinkerhoff et al. | 315—110X |
| 3,296,552 | 1/1967 | Peters | 313—175X |
| 3,388,314 | 6/1968 | Gould | 331—94.5X |
| 3,465,358 | 9/1969 | Bridges | 331—94.5 |

JOHN KOMINSKI, Primary Examiner

C. R. CAMPBELL, Assistant Examiner

U.S. Cl. X.R.

313—174; 315—110